United States Patent [19]
Traina

[11] Patent Number: 6,094,993
[45] Date of Patent: *Aug. 1, 2000

[54] METHOD FOR MEASURING FLOW RATE OF A FLUID IN A CONDUIT

[75] Inventor: John E. Traina, Glenshaw, Pa.

[73] Assignee: United Sciences Testing, Inc., Gibsonia, Pa.

[*] Notice: This patent is subject to a terminal disclaimer.

[21] Appl. No.: 09/056,538

[22] Filed: Apr. 8, 1998

[51] Int. Cl.⁷ ....................................................... G01F 1/46

[52] U.S. Cl. ..................... 73/861.65; 73/861.66; 73/861.67

[58] Field of Search .............................. 73/861.65, 861.66, 73/861.67, 861.06

[56] References Cited

U.S. PATENT DOCUMENTS 5,440,217  8/1995  Traina ...................................... 318/644
5,509,313  4/1996  Traina et al. ...................... 673/861.065

Primary Examiner—Harshad Patel
Attorney, Agent, or Firm—Buchanan Ingersoll, P.C.

[57] ABSTRACT

A method of measuring fluid flow through a conduit takes a plurality of pressure readings at a high sampling rate preferably of from 15 to 25 samples per second. The square root of each reading is found. An average of those square roots is multiplied by a predetermined constant to find the flow rate.

6 Claims, 2 Drawing Sheets

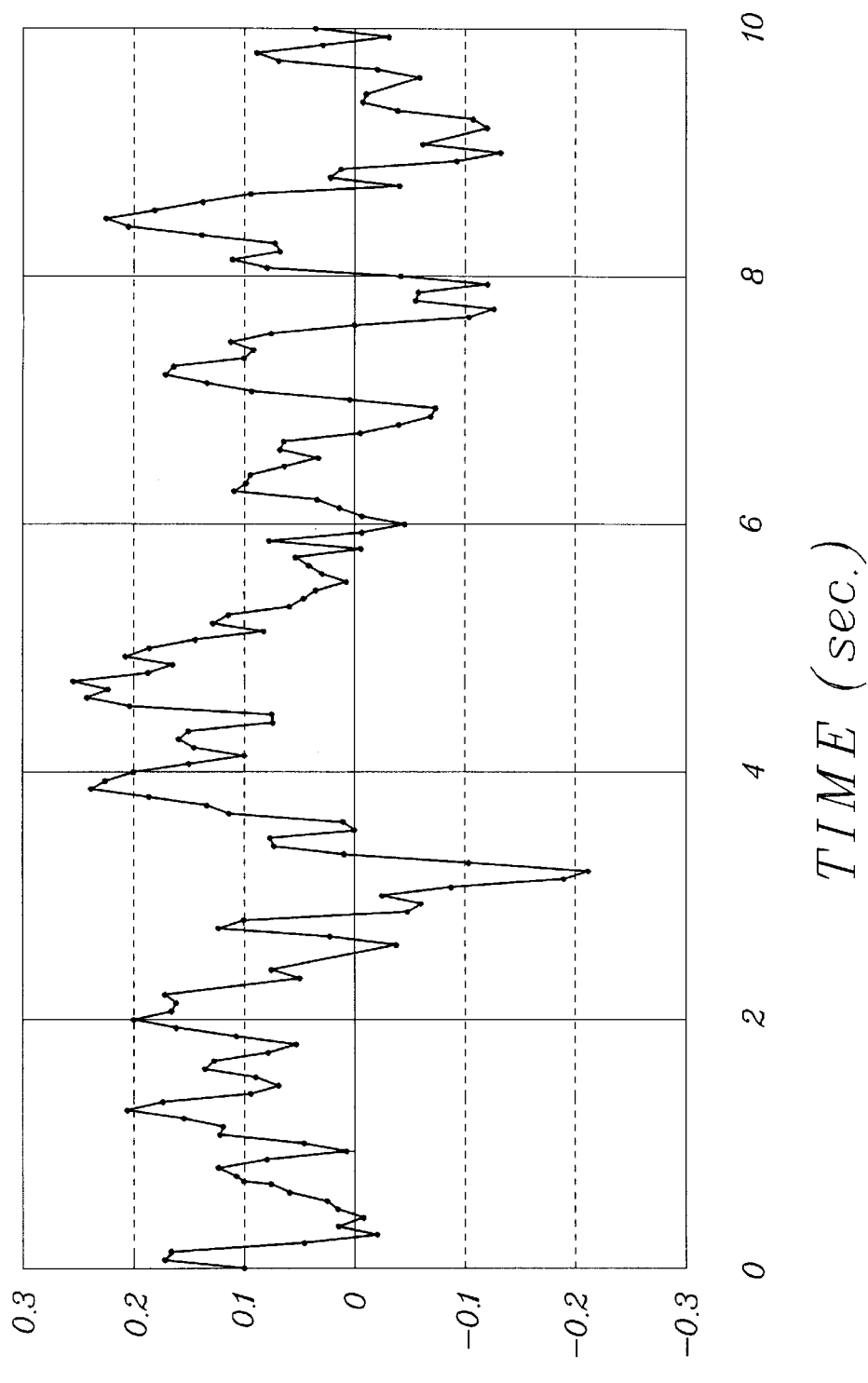
Fig. 2. PRESSURE VS. TIME

METHOD FOR MEASURING FLOW RATE OF A FLUID IN A CONDUIT

FIELD OF THE INVENTION

The invention relates to methods for measuring the flow rate of a fluid, particularly stack gases through a conduit which is useful for emissions monitoring.

BACKGROUND OF THE INVENTION

There are many situations in which there is a need or desire to measure the rate of flow of a liquid or gas through a conduit. Because of the shape of the conduit, temperature differentials within the conduit and other factors, not all of the fluid may be flowing parallel to a centerline through the conduit. Rather the true flow direction at any specific location may be, and frequently is, at some angle relative to the centerline. Furthermore, the flow rate may not be constant during the measurement period. Indeed, there may be perturbations or an oscillatory component to the velocity. Consequently, placing a pitot tube or other measuring device parallel to the walls of the conduit will not yield accurate results. In my U.S. Pat. No. 5,509,313 I disclosed a method for positioning a probe so that the probe was aligned with the true flow direction. Although this method has provided more accurate data the results have been above the true velocity.

The federal government of the United States has set limits as to the amount of pollutants that an electric utility or other business may emit into the air. Typically, these emissions are determined from measurements of the flow rate of the stack gasses through the stack and an analysis of the stack gasses to determine the levels of pollutants which are present. If one knows the flow rate and has another monitor which measures the concentration of pollutants in a selected volume of fluid one can calculate the quantity of pollutants emitted over any selected time period.

The United States has additional regulatory requirements which now require many electric utilities to continuously measure emissions of specified pollutants on a mass per unit time basis. Additionally, the continuous monitors must be periodically tested to assure that they are functioning properly. When such tests are done one must use a "reference method" measuring device. If the reference method monitor shows the continuous monitor to be reading low, the continuous monitor must be recalibrated. Adoption of these rules has put a new importance upon the errors which occur both in continuous monitoring and in the periodic reference method verification tests. Such errors can be very costly to both the supplier of the monitor and the utility. The supplier is affected because the reference method can erroneously indicate that the monitor is not meeting the performance guarantee. The utility is affected because it may have been reporting the emission of more pollutants than actually occurred. The new regulations establish monetary value in the form of trading credits to a measured ton of $SO_2$ emissions. If the reference method is in error, that error will directly cause an enormous high or low use of the utility's $SO_2$ allowance and $SO_2$ trading credits. The value of such emissions is such that for large utilities as much as $1,000,000 per percent error in measured emissions may result. Thus, there is a need for a method which can accurately determine the true flow rate or velocity of a fluid flowing through a conduit.

In performing the required reference method verification tests the technician typically uses a type S (also called S-type) pitot tube made to specific dimensions. At specified points the tester measures a differential pressure. The static pressure is also taken at selected points. The differential pressure reading is then used to compute flow rate. From the computed flow rate and an analysis of fluid samples taken from the conduit, the amount of pollutants from the stack is calculated.

The test procedure required by the United States Environmental Protection Agency (EPA) is set forth in 40 Code of Federal Regulations, Part 60, Appendix A, Methods 1 and 2. This method can be performed by manually positioning the probes at the specified locations in the stack or by using an automated probe such as is disclosed in my U.S. Pat. No. 5,440,217. Within the past year the EPA and others have done studies to determine the accuracy of various manual and automated procedures currently being used. The test results indicated that all procedures resulted in calculated emissions of pollutants that were higher than the actual emissions. Furthermore, some methods produced results that were much higher than were the results than other methods. Those who conducted the tests did not have any explanation for the differing results.

In my U.S. Pat. No. 5,509,313 I reported that the art has conventionally determined flow rate by taking several differential pressure readings averaging these readings and then finding the square root of that average. However, I found that a more accurate result can be determined by taking the square root of each reading. Although this is true, flow rates and corresponding calculated emissions using this technique also were observed to be higher than actual levels in the tests done by EPA and others.

Consequently, there is a need for a more reliable and more accurate method to measure true flow rate of a fluid through a conduit.

SUMMARY OF THE INVENTION

A method of measuring fluid flow through a conduit takes a plurality of pressure readings at a high sampling rate of at least 5 and preferably 25 samples per second. The objective is to sample at a rate that is fast enough to follow the pressure and velocity perturbations in the moving fluid and to follow any probe bouncing that is occurring. The square root of each such reading is found. An average of those square roots is multiplied by a predetermined constant to find the flow rate. This method is more accurate than the traditional method of averaging and then finding the square root. Furthermore, unlike the traditional method the present method is not affected by differences in velocity or a change in the frequency of oscillation of the probe.

BRIEF DESCRIPTION OF THE FIGURES

FIG. 2 is a graph of pressure readings taken in a smoke stack at an average sampling rate of 15 samples per second.

DESCRIPTION OF THE PREFERRED EMBODIMENTS

Figure 1:
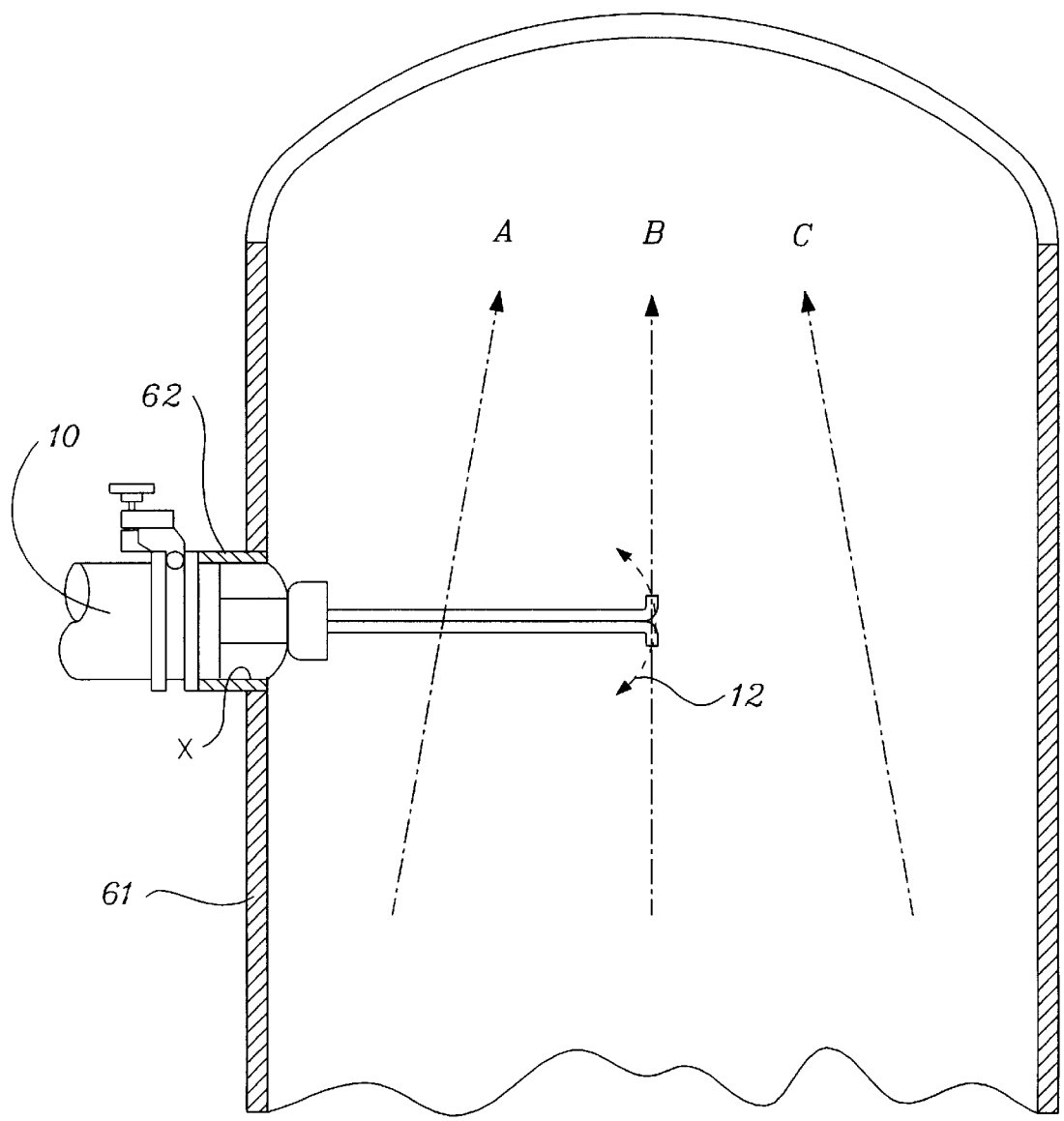
FIG. 1 is a perspective view of a section of a stack in which emission readings are to be taken.

The present method can best be understood in the context of a sampling probe being used in a smokestack such as is illustrated by the diagram of FIGS. 1 and 2. A probe assembly 10 is mounted to a port 62 in a stack 61 in which emissions monitoring is performed. The probe assembly is held on the stack 61 by a clamp which attaches the probe assembly to the stack at point x. I prefer to construct the end of the probe assembly 10 and port 62 to have a slot and key arrangement so that the probe will always be at the same orientation relative to the stack when it is attached to the port. Consequently, the pitot tube will be initially oriented to be aligned with a line parallel to a centerline through the conduit. That centerline corresponds to vector B in FIG. 1. For purposes of the present method and in accordance with the practice in the art, vector B is considered the nominal flow direction.

Assume that the test method requires readings to be taken at points on vectors A, B and C. At any given point the true flow direction will have three components, a vertical component, a yaw component and a pitch component. The vertical component is parallel to a centerline through the conduit. The yaw component is movement in a direction left or right relative to a person looking into the stack from the port 62. The pitch component is movement in a direction forward or away from a person looking through the port.

The type of testing performed by the probe used for the present method is almost always done several diameters away from any disturbance in the conduit. Consequently, any pitch which has been created by the disturbance is significantly damped before it reaches the test area and usually is minimal.

The probe illustrated in FIG. 1 is not configured to measure flow in the pitch direction unless the probe is moved 90° and advanced to the same point. However, since the flow component in the yaw direction is almost always substantially greater than the pitch component the relative contribution of the pitch component to the true flow direction is very small. Hence, the pitch component can be usually ignored. For purposes of the present description we will use the phrase "measured true flow direction" to mean the actual flow direction of the fluid in the conduit as measured using the present method which does not consider pitch.

The true flow direction may be different at different points in the same plane as indicated by the vectors A, B and C in FIG. 1. After the probe is properly mounted, the tip of the probe is advanced to the first selected sampling point. At each point the probe must be rotated to find the true flow direction. Then a series of differential pressure readings are taken along the true flow direction and the flow rate of the fluid in that true flow direction is calculated.

Whenever the S-type pitot tube is oriented to have a zero pressure differential between its two opposite openings the pitot tube is said to be at a null position or null angle. Once the null angle is found, the true flow direction can be assumed to be 90° away provided the pitch component is negligible. In U.S. Pat. No. 5,509,313 there is disclosed a preferred method to find the null angle in the yaw direction. The measured true flow direction is then the null angle plus or minus 90°. That patent also contains a detailed explanation of how the probe is positioned and a series of differential pressure readings are made. That description is incorporated herein by reference.

In many conduits, particularly large smoke stacks, flow of fluid within the conduit tends to cause the pitot tube to oscillate harmonically such that there will be a period of oscillation. Although such oscillation may occur in any direction, movement in the vertical direction will have the most significant impact upon the results. For purposes of illustration I indicate the oscillation as up and down movement through the arc 12 shown in dotted line in FIG. 1. This oscillation may be more than five inches (18 centimeters) above and below its original position. The differential pressure reading will be different at different points along the arc 12. If a conventional pressure gauge is attached to the end of the pitot tube the pressure reading will tend to be an average of the different pressure through the arc. I have discovered that use of this average pressure reading is a significant factor in producing the higher than actual readings which have been observed by the EPA and others.

The velocity may also change as the result of turbulence. These velocity perturbations could be continuous and repetitive in nature so as to produce a similar effect to oscillation of the probe. The velocity changes may also be erratic appearing to be noise. Yet, even the non-cyclical velocity perturbations can affect the determination of flow rate based upon pressure differential measurements.

If one took differential pressure readings at several points along the arc 12 those pressure readings would be different. FIG. 2 is a graph of actual pressure measurements taken in a smoke stack over a period of ten seconds using an Autoprobe automated testing device manufactured by United Sciences Testing Inc. of Gibsonia, Penn. That device is similar to the probe disclosed in U.S. Pat. No. 5,440,217. Sampling was done at an average rate of 15 samples per second. As can be clearly seen from the graph of FIG. 2, no two consecutive pressure readings are the same and the reading vary greatly. The highest reading is a positive 0.26 while the lowest reading is a negative 0.21. These differences may be attributable to oscillation of the probe, rapid perturbations in the velocity or a combination of these factors. Whatever the cause if one were to average these pressures and then take a square root of the average the result would lead to a flow rate that is higher than the true flow rate. I have discovered that by taking several pressure readings during each cycle of oscillation, taking a square root of each reading and then averaging those individual pressures to calculate flow rate the result will be closer to actual and lower than is obtained by other techniques. Although the data reported in FIG. 2 was obtained using an average sampling rate of 15 samples per second, I have found sampling rates as high as 25 samples per second to be effective.

To determine the amount of error that occurs between the conventional practice of averaging and then taking the square root compared to my method of square rooting and then averaging I created a model. In this model I began with the equation:

velocity in feet per second equals 70 times the square root of pressure change The constant 70 is a value that is associated with the molecular weight, temperature and pressure of the contents of the conduit being considered and is also related to the calibration of the pitot tube being used. For different media and different probes that constant will differ. Then I created a spread sheet to simulate pressure readings every 0.005 seconds using different frequencies. From those readings I calculated velocity using the conventional method and my method. I then compared the results to the true value and determined a percent error. The results are shown in Table 1.

TABLE 1

| Case Number | 1 | 2 | 3 | 4 | 5 | 6 | 7 |
|---|---|---|---|---|---|---|---|
| Pressure Change (ΔP) | 0.1 | 0.2 | 0.5 | 0.1 | 0.2 | 0.5 | 0.5 |
| Probe movement | | | | | | | |
| Frequency (Hz.) | 1 | 1 | 1 | 2 | 2 | 2 | 3 |
| Amplitude (ft.) | 1 | 1 | 1 | 1 | 1 | 1 | 1 |
| True velocity | 22.136 | 31.305 | 49.497 | 22.136 | 31.305 | 49.497 | 49.497 |
| TYP* velocity | 22.579 | 31.620 | 49.698 | 23.856 | 32.545 | 50.292 | 51.266 |
| MY* velocity | 22.138 | 31.307 | 49.499 | 22.139 | 31.308 | 49.501 | 49.502 |
| TYP % Error | 2.00% | 1.00% | 0.41% | 7.77% | 3.97% | 1.61% | 3.57% |
| MY % Error | 0.01% | 0.01% | 0.00% | 0.01% | 0.01% | 0.01% | 0.01% |

*TYP velocity determined by averaging then finding square root.
*MY velocity determined by finding square root and then averaging.

From cases 1 through 7 we can see that the amount of error is higher at lower velocities using the conventional method of averaging and then finding the square root of the differential pressure readings. Comparing cases 1, 2 and 3 with 4, 5, 6 and 7 we see that an increase in frequency increases the amount of error when using the conventional method. However, my method not only has a much smaller error but the amount of error is not affected by either the changes in velocity of the fluid or the frequency of oscillation of the probe. I attribute my low error to sampling at a rate faster than the oscillation, square rooting the reading, then averaging the results.

Another factor to be considered is the probe itself. Those skilled in the art know that when a fluid travels through a conduit the pressure of the fluid can be affected by the length of the conduit, bends in the conduit and changes in the diameter of the conduit. For that reason the pressure measurement apparatus must have the ability to not only sample at a rate that is faster than the pressure perturbations, but also must be configured so as not to damp the pressure of a fluid as the fluid flows through the probe. More specifically, that the overall pressure measurement apparatus must be able to follow the pressure changes and the volume and size of the lines to the pressure sensor must minimally dampen the reading.

Although I have described and shown certain present preferred embodiments of my method for determining flow rate, it should be distinctly understood that the invention is not limited thereto, but may be variously embodied within the scope of the following claims.

I claim:

1. A method of determining flow rate of a fluid through a measurement point comprising the steps of:

a. placing at the measurement point a probe capable of measuring differential pressure at the measurement point;

b. taking a plurality of differential pressure readings at the measurement point with the probe having a period of oscillation the pressure readings being taken at a rate of at least twice the period of oscillation of the probe;

c. taking a square root of each pressure reading;

d. averaging the square roots found in step c to create an average value; and e. multiplying the average value by a pre-selected constant to determine flow rate.

2. The method of claim 1 wherein the pressure readings are taken at least 5 times per second.

3. The method of claim 1 wherein there are changes in velocity of the fluid at the measurement point.

4. The method of claim 1 wherein the pressure readings are taken at an average rate of from 15 to 25 pressure readings per second.

5. A method of determining flow rate of a fluid through a measurement point wherein the fluid velocity has perturbations along a flow direction comprising the steps of:

a. placing at the measurement point a probe capable of measuring differential pressure at the measurement point;

b. taking a plurality of differential pressure readings at the measurement point, the pressure readings being taken at a rate of at least 5 pressure readings per second;

c. taking a square root of each pressure reading;

d. averaging the square roots found in step c to create an average value; and e. multiplying the average value by a pre-selected constant to determine flow rate.

6. The method of claim 5 wherein the differential pressure readings are taken at an average rate of from 15 to 25 pressure readings per second.

* * * * *